UNITED STATES PATENT OFFICE.

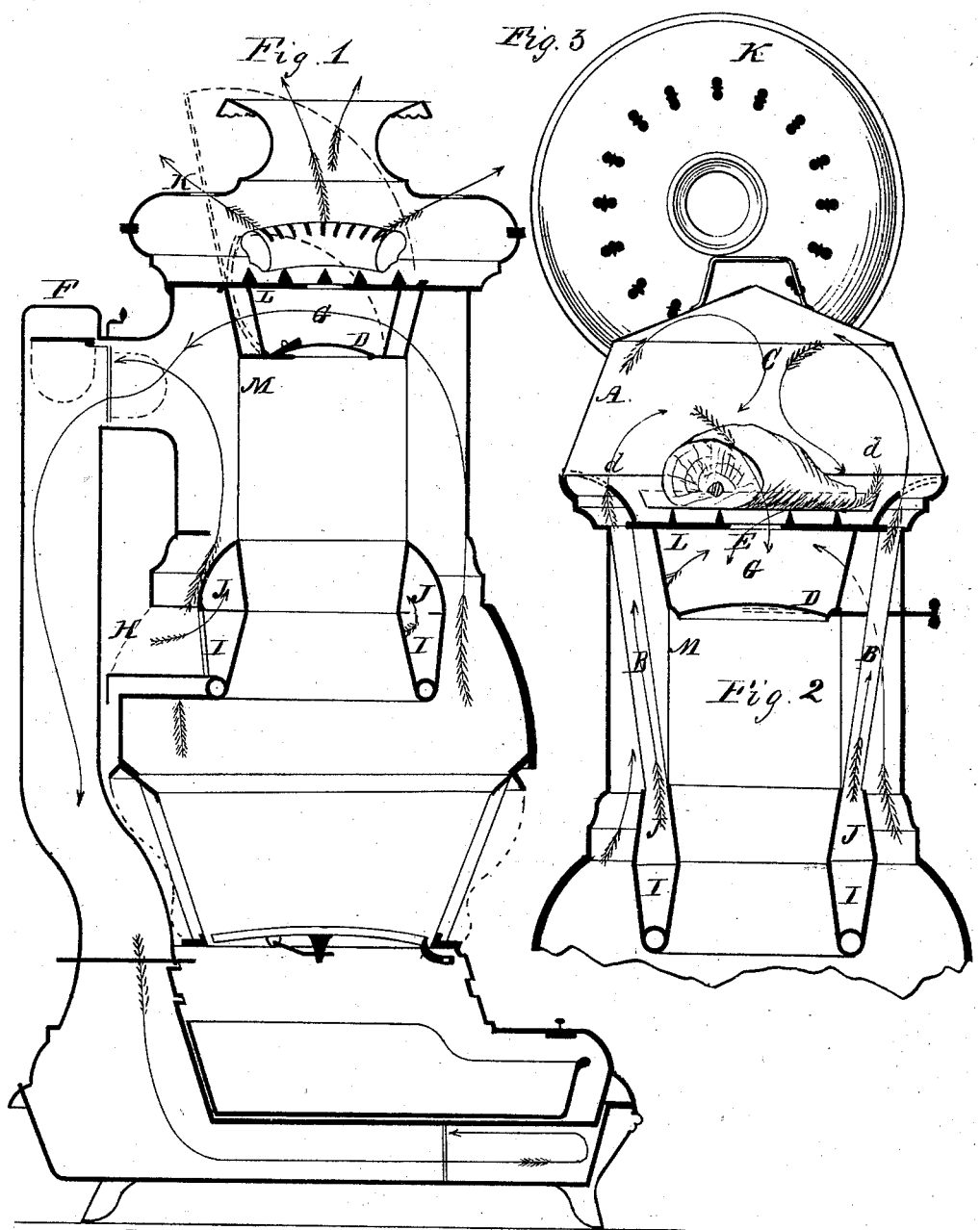

HENRY G. GILES, OF TROY, NEW YORK.

IMPROVEMENT IN HEATING-STOVES.

Specification forming part of Letters Patent No. 165,414, dated July 13, 1875; application filed April 7, 1873.

*To all whom it may concern:*

Be it known that I, HENRY G. GILES, of the city of Troy, in the county of Rensselaer and State of New York, have invented certain Improvements in Heating-Stoves, of which the following is a specification, reference being had to the accompanying drawings and the letters thereon.

My invention relates to a portable or permanent oven for baking or roasting on the top or side of a base-burning, or what is known as a self-feeding stove, heated mainly by the circulation of hot currents of air, in combination with a flue or flues, for conducting heated air to said oven; an opening from said oven to carry off the hot air introduced from said flue or flues for the purpose of producing a rapid circulation of hot air in the oven-space; also a top cover, which covers the whole top of stove, to be used when not using the oven, and more particularly described below.

Figure 1 is a sectional view, cut through the center of the stove from front to rear. Fig. 2 is a sectional view of the upper half of the same stove, cut through from side to side.

A represents the portable oven; B, the flues conducting hot air into the oven-space C. The arrows *d d* show the course of the hot air in passing down and under the bake-pan to the center of the oven-bottom, or top of the stove, and down through the aperture E, over the top of the magazine, from whence it is conducted to the exit-flue F. The space G is a flue over the top of magazine, through which most of the heated product of combustion is passed to the exit-pipe. At H the cold air is admitted and carried through a bifurcated flue from rear to front, and thence up into a corresponding flue, and conducted back to the flues B B, and thence up into the oven C. The air, being brought into the bifurcated flue I, and passed so nearly in contact with the top of the fire, and thence back in the flue J, becomes sufficiently heated for baking or roasting purposes, as it is admitted to the oven above, and does its work quicker and better than a radiated heat will do the same thing.

The advantages of the portable oven A is that it (being made of sheet metal) may be removed at pleasure, and the top K closed down, leaving a beautiful heating parlor-stove, without the least appearance of any cooking attachment, which is objectionable to a parlor-stove.

When baking or roasting, the aperture E serves the very desirable purpose of conducting off the steam and gas arising from its operation. The flue G, over the top of magazine, effects the concentration of heat at that point, so when the lid L is removed we have an effective place for boiling tea-kettle or other purpose, thereby adapting it the purpose above named. K is a removable top cover, hinged on one side, and which, when turned up or removed, uncovers the whole top of the stove from side to side, leaving it free for placing the portable oven on or for raising the lid L and D, and pouring in fresh coal. One advantage of this cover K is that it uncovers a large space or mouth for feeding, without dropping over on the floor, and also to catch all dust or dirt that may arise from the operation; and secondly, it uncovers a large free space to receive the oven and articles to be warmed or cooked, besides being more safe and easy for feeding.

This cover is made with openings for the passage of the hot air from the flues B B, up through and into the room for additional heating power, when the top of the stove is not being used for baking or cooking purposes. It may be made solid, but would not be in that case so beneficial for heating.

What I claim, and desire to secure by Letters Patent, is—

1. The oven A, flue or flues B, and aperture E, in combination with a feeding-magazine, M.
2. The oven space C, aperture E, and flue G, in combination with a feeding-magazine, M.
3. The oven-space C, flue or flues B, aperture E, and exit-flue F, in combination with a feeding-magazine, M.
4. The top K, flue or flues B, and lid L, in combination with a feeding-magazine, M.

H. G. GILES.

Witnesses:
JNO. M. CARY,
H. J. KING.